MAURICE G. JEWETT
BENJAMIN E. SIVYER
INVENTORS

BY George A Evans
ATTY.

Jan. 1, 1952     M. G. JEWETT ET AL     2,580,786
CONVEYER FLIGHT
Filed July 8, 1946     2 SHEETS—SHEET 2
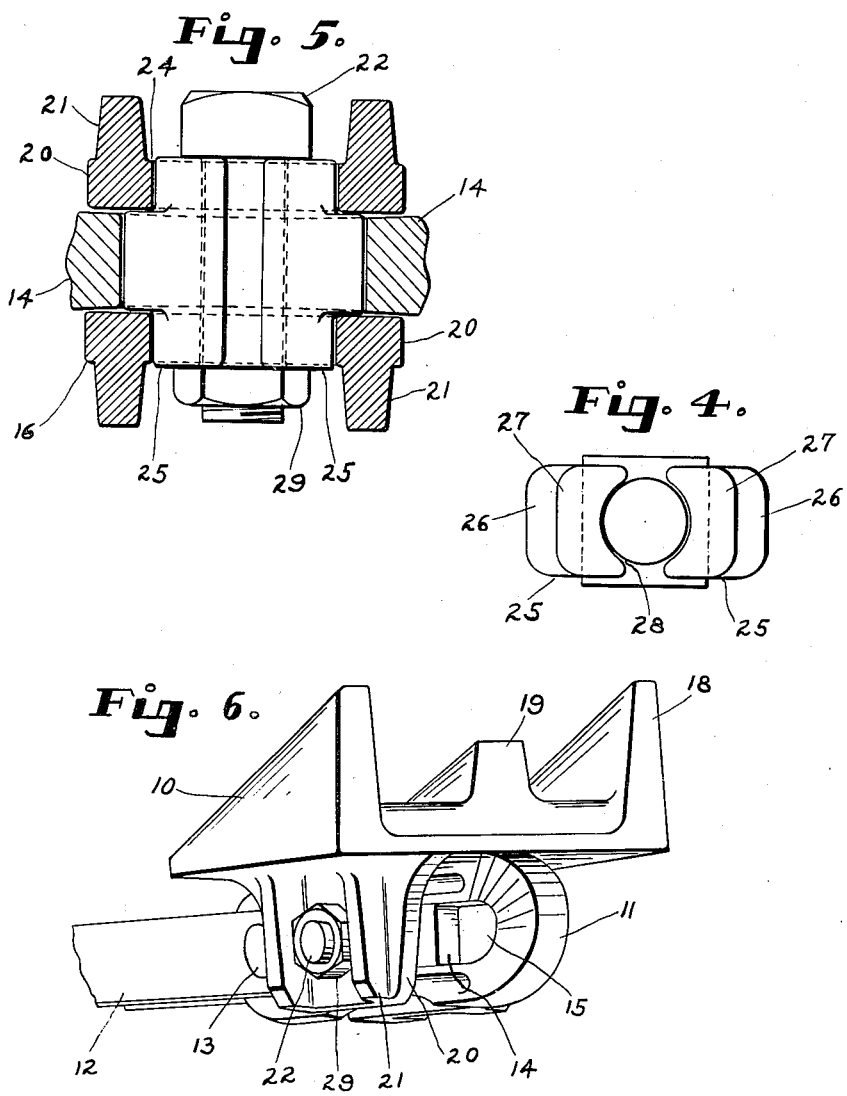
MAURICE G. JEWETT
BENJAMIN E. SIVYER
*INVENTORS*
BY *George A. Evans*
ATTY.

Patented Jan. 1, 1952

2,580,786

UNITED STATES PATENT OFFICE 2,580,786

CONVEYER FLIGHT

Maurice G. Jewett, Milwaukee, and Benjamin E. Sivyer, Whitefish Bay, Wis., assignors to Chain Belt Company, Milwaukee, Wis., a corporation of Wisconsin Application July 8, 1946, Serial No. 682,030

11 Claims. (Cl. 198—176)

This invention relates to improvements in chain attachments, particularly to an attachment which is secured to a chain and is therewith utilized with a trough or support to convey mill refuse, logs and diverse other materials. Further, this invention relates to a flight attachment for a chain which is usually formed of alternate cast or forged links of a variety somewhat like the "keystone" type connected by steel side bars; the links and bars being connected together by means of the usual type pintle so as to form a chain strand adapted to run over sprockets in a trough. This type of chain is well adapted to conveying uses in that it has high tensile strength, resists wear, can absorb shock loads and is easily connected and disconnected.

The invention is further generally concerned with a flight for attachment to such a chain and the links comprising it. Further it concerns a flight having inserts which lock the flight to the links and also means to hold the inserts in locking position, said means being protected from abrasive forces.

Attachments to the aforesaid type chain have presented unique problems in that they must be fastened to one of the links. Fatigue failures have usually occurred at the point of connection to the link. Flight attachments are oftentimes desired in conveying uses, however all of the attachments have always presented problems in that they formerly could not be attached to a chain link without running counter to the shearing forces usually exerted on the flight holding means.

To overcome the stated difficulties, instrumentalities have been made to hold the flights in the cast links, such as machine parts, special links, and straps with bolts. But these too have been ultimately susceptible to fatigue failure. Another disadvantage quickly manifested was the great difficulty encountered when a flight was to be removed from, or replaced on the links.

This invention overcomes these objections for:

It is the object of this invention to provide a flight which can be connected to a chain in a facile manner.

Another object of this invention is to provide a flight whose holding means are safeguarded from abrasive forces.

Still another object of this invention is to provide a flight for simple attachment to a chain link similar to the "keystone" variety.

It is further the object of this invention to provide a flight for such a type of link which can be attached thereto without being directly affixed to said link.

Another object of this invention is to provide locking instrumentalities for a flight which are readily attached to and removed from a link.

Other objects will appear in the examination of the following figures and in the reading of the specification.

In the drawings, the invention is illustrated with a chair-type flight, the latter being selected as a preferred embodiment because the problem of attaching such a flight to a chain has heretofore presented a most difficult problem.

Referring to the drawings, it will be noted that:

Fig. 4 is a detail of the inserts used to lock the flight onto the link.

Fig. 5 is a partial section broken away, taken on line 5—5 of Fig. 3 and shows the inserts in place and locked against the link.

Fig. 6 is a perspective view of a flight attached to a link.

In the drawings like numerals refer to like parts throughout.

Figure 1:
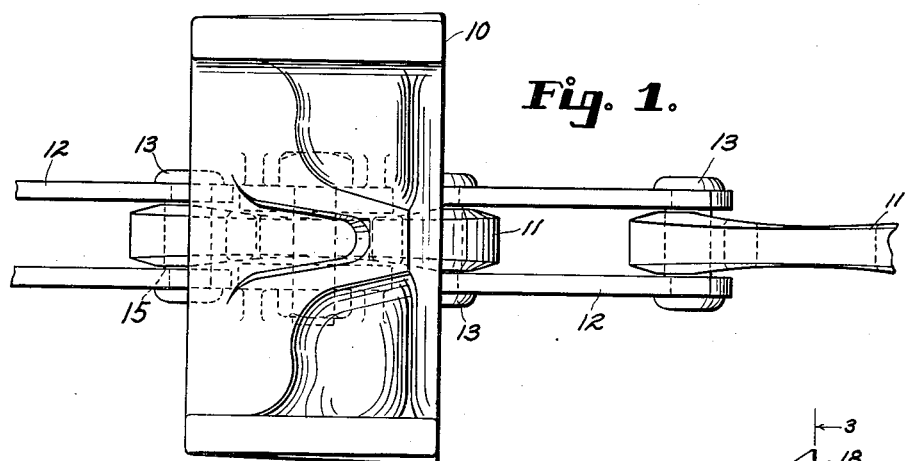
Fig. 1 is a plan view of a chair type flight attached to a conventional cast link in a chain strand.

Referring to specific drawings Fig. 1 shows the chair flight 10 attached to the link 11. The chain is made up of alternate links 11 and side bars 12, a pintle 13 alternately connecting the side bars to the links 11 to form a strand of chain. The reinforcing struts 14 are transverse to the longitudinal axis of the link 11 and are integral parts of the link. They are positioned so as to form apertures 15 at each end of the link through which the pintles 13 are inserted. A larger aperture 16 is also thereby formed with the longitudinally extending top and bottom sides 17 of the link 11, at the central portion of the link.

The chair flight 10 has upstanding dogs 18 on each lateral edge of the upper surface and also an intermediate dog 19 on said surface. On the bottom surface, both equidistant from the vertical center line of the attachment are two depending flanges 20 arranged to straddle the intermediate portion of the link 11. Braces or reinforcing members 21 extend from the lateral edge on the upper surface, on a bias extending to the depending flanges to reinforce the same, and they are also arranged to provide sheltered recess for the bolt 22. When the chair flight 10 is assembled with the link 11 the flanges 20 extend beyond the lower intermediate portion 17 of the link 11; thus the flanges 20 rest on the trough 23 in which the chain strand runs, so that the vertical forces are not transmitted to the link itself. This feature further preserves the useful life of the chain strand, for it permits the transmission of forces to the trough floor which otherwise would be absorbed by the chain links themselves. This is evident by reference to Figs. 2 and 3.

Figure 2:
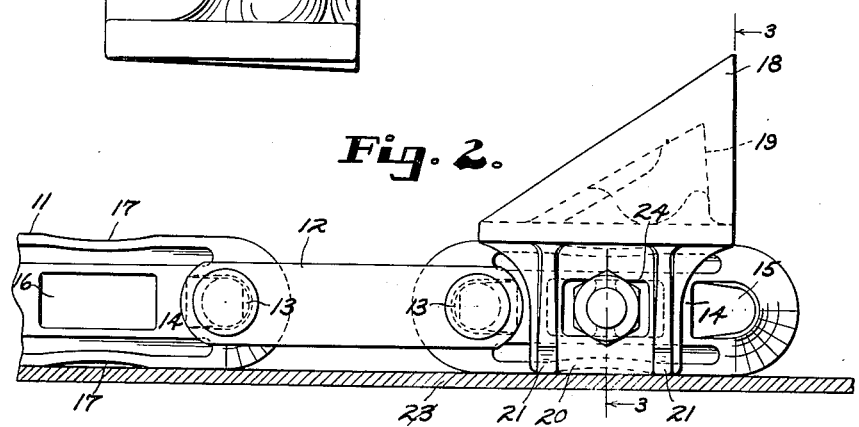
Fig. 2 shows a front elevation of the chair flight attached to the link in the chain.
Figure 3:
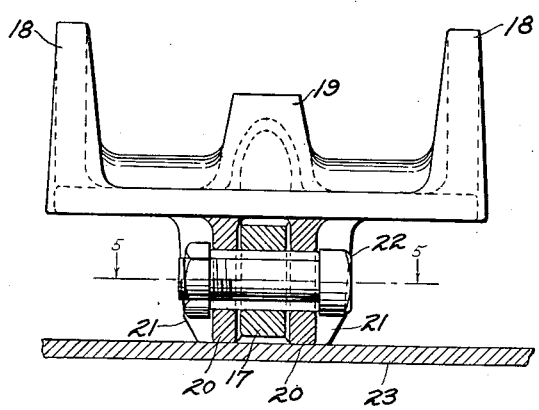
Fig. 3 shows a sectional view of the chair flight and the link taken along the lines 3—3.

On each flange 20 an aperture 24 is centrally disposed therein so as to register with the aperture 16 of the link 11 when the flight is assembled with the link as seen in Figs. 2 and 3. The flight is assembled and attached to the chain in an extremely simple manner. The flight 10 is first centrally positioned on the link 11 so that the aperture 24 in the flanges 20 registers with the aperture 16 of the link 11. Thence a locking insert 25 shown in Fig. 4, is inserted through said opening; the width of the locking insert is such that it may be easily inserted therethrough. The insert 25 has an extension or tongue 26 which may be positioned between the two flanges 20 and brought into abutment with the strut 14; this is evident from Fig. 5. Also, the insert 25 has offset surfaces 27 which register with the end surfaces of the apertures 24 disposed in the depending flanges 20; this is also evident from Fig. 5. The central inside surface 28 of the insert is concave along its entire length so as to form an accommodating recess for the holding means 22. Thus, upon attachment the insert 25 is slid through the center of the opening provided in the flanges and chain link, whereupon the insert is moved toward one end of the link so that the extension 26 abuts the strut 14 and is also registered with the internal sides of the flanges 20. Next a similar insert 25 is inserted into the space remaining and moved toward the other strut as aforesaid. These actions permit the subsequent disposition of a bolt 22 through concave portions of the aperture remaining.

The periphery of the bolt 22 registers with the concave surfaces 28 of the locking inserts 25. The bolt is secured at one end by a nut 29 and thereupon the flight is securely locked to the link 11. It will be noted that this invention is characterized by the fact that the bolt 22 is relieved of shearing forces which, in prior structures, were transmitted by the conveying flight attachments to the bolting means themselves. Further the nut 29 and the head of the bolt 22 are protected from abrasive actions by virtue of the fact that they repose in the recess formed by the bias struts 21. Hence, the nut and bolt can be removed in a facile manner, even after long service under abrasive conditions.

This invention is not limited to the instant embodiment as it can be readily applied to many forms of conveyor flights which are attached to similar chain links. Thus, it is to be limited only by the clear import of the following claims.

We claim:

1. A detachable assembly of a flight and an integral chain link having a centrally disposed aperture defined by struts integral with the link, the flight having a conveying face and flanges depending from the lower surface of the flight arranged to straddle the intermediate portions of said links, said flanges having apertures disposed to register with the aperture in said link, but of shorter length than the link aperture, locking inserts for said assembly arranged to abut said struts and engage the sides and ends of the openings in said flanges, and a bolt disposed between said inserts to retain their locking position whereby the flight is securely fastened to the link.

2. Apparatus according to claim 1 in which the locking inserts consist of two members, each member substantially the same, a tongue portion on said insert, offset portions on each side of the tongue portion, a surface on the insert opposite the tongue portion substantially conformable to the periphery of a bolt inserted between both inserts and clearance between said inserts whereby both inserts can be inserted into or removed from the registering apertures of flight and link when said bolt is removed therefrom.

3. Conveying apparatus for cooperating with a supporting floor surface, comprising a strand of chain with flight attachments adapted to move along the top of the floor surface, said strand of chain being comprised of links and side bars pivotally joined by a pintle, a link having a centrally disposed aperture defined by struts integral with the link, the flights having a conveying surface, the improvement further comprising flanges depending from said flight arranged to straddle the intermediate portions of said link and to extend beyond said link to ride on the top of the floor surface whereby vertical forces on the flight are transmitted to the floor surface, said flanges having apertures disposed to register with the aperture in said link; locking means for insertion thru said registering apertures and arranged to lock the flights on the links, and holding means disposed with the locking means to firmly space them apart, whereby the flight is held on the link.

4. Conveying apparatus for cooperating with a supporting floor surface, comprising a strand of chain with flight attachments adapted to move along the top of the floor surface, said strand of chain being comprised of links and side bars alternately pivotally joined by a pintle, the link having a centrally disposed aperture; the flight having a top surface and conveying members, the improved structure further comprising flanges depending from said flight and arranged to straddle the intermediate portions of said link and to extend beyond said link to ride on the top of the floor surface whereby vertical forces on said flight are transmitted to the floor surface, said flanges having apertures disposed to register with the apertures in said links, reinforcing members extending from the bottom surface of said flight to the depending flanges, said members being disposed to form a recess; locking means for insertion thru said registering apertures and arranged to lock the flight on the link, and holding means disposed with the locking means to firmly space them apart, the ends of said means being sheltered in the said recess, whereby the same is protected from abrasive actions.

5. Fastening means for securing a chain link having an open center portion to a straddling attachment having registering openings of shorter length than the opening in the link, said means comprising an insert insertable through said openings with a tongue portion of a width corresponding to the width of said chain link and end portions engageable with the sides of the openings in said attachment, and means bearing against the opposite ends of said insert maintaining the tongue portion of the insert in locking engagement between the link and attachment.

6. Fastening means for securing a chain link having an open center portion to a straddling attachment having registering openings of shorter length than the opening in the link, said means comprising a pair of inserts insertable seriatim through said openings, each of said inserts having a tongue portion of a width corresponding to the width of said chain link and end portions engageable with the sides of the openings in said attachment, and a holding member for spreading the inserts apart when so inserted and maintaining the tongue portions of the inserts in locking engagement between the link and attachment.

7. An attachment for a chain link having an open center portion comprising a flight with flanges disposed to straddle said link, said flanges having openings of shorter length than the opening in the link overlapping the same, an insert insertable through said openings with a tongue portion of a width corresponding to the width of said chain link arranged to abut the link, and end portions engageable with the sides of the openings in said attachment, and means bearing against the opposite ends of said attachment openings maintaining the tongue portion of the insert in locking engagement between the link and attachment.

8. In a chain conveyer, a chain comprising a link presenting a transverse aperture, a conveyer flight having a bifurcated portion constituting flanges disposed to straddle said link and presenting in said flanges apertures registering with but dissimilar from said transverse aperture in said link, and an expansible locking insert unit adapted to be inserted into said registering dissimilar apertures and shaped to be expanded into engagement with the innner surface of each aperture, whereby said locking unit is restrained from displacement by engagement with said dissimilar apertures and serves to attach said conveyer flight securely to said chain.

9. In a chain conveyer, a chain comprising a link presenting a transverse non-circular aperture, a conveyer flight having a bifurcated attachment portion constituting flanges disposed to straddle said link and presenting non-circular apertures dissimilar from and positioned in alignment with said transverse non-circular aperture in said link, a locking insert adapted to be inserted into said aligned apertures and shaped to engage the inner surfaces of all of said apertures simultaneously when displaced laterally therein, and holding means arranged to retain said locking insert in engagement with said dissimilar apertures, whereby said locking insert is restrained against displacement in said apertures and serves to secure said conveyer flight rigidly to said chain.

10. A chain conveyer flight for attachment to a chain having a link presenting a transverse aperture, comprising a conveying flight portion and a bifurcated attachment portion constituting flanges disposed to straddle a chain link and presenting in said flanges apertures registering with but dissimilar from said transverse aperture in the chain link, a pair of locking inserts adapted to be inserted through said registering apertures and constituting an expansible locking member shaped to engage the inner surfaces of said dissimilar apertures, and holding means arranged to separate said locking inserts to expand said expansible locking member into engagement with said dissimilar apertures, whereby said locking member is restrained from displacement from said apertures and serves to attach said conveyer flight securely to the chain link.

11. In a chain conveyer flight for attachment to a chain having a link presenting a transverse aperture, a flight unit having a bifurcated lug disposed to straddle the chain link and presenting aligned apertures dissimilar from the aperture in the link but disposed in register therewith when in position for attachment to the link, and an expansible locking insert unit adapted to enter said aligned apertures and to be expanded into engagement with said apertures in said flight and the dissimilar aperture in the chain link, whereby said locking unit is restrained from displacement from said dissimilar apertures and said flight is securely attached to the chain.

MAURICE G. JEWETT.
BENJAMIN E. SIVYER.

REFERENCES CITED

The following references are of record in the file of this patent:

UNITED STATES PATENTS

| Number | Name | Date |
| --- | --- | --- |
| 1,133,539 | Coldren | Mar. 30, 1915 |
| 1,910,804 | Lomando | May 23, 1933 |
| 2,061,228 | Elmer | Nov. 17, 1936 |
| 2,278,853 | Hudson | Apr. 7, 1942 |